July 30, 1946.　　　　R. W. McLAREN　　　　2,404,857
FASTENER FOR POSITIONING, ALIGNING, AND SECURING PLATES FOR WELDING
Filed Nov. 24, 1942
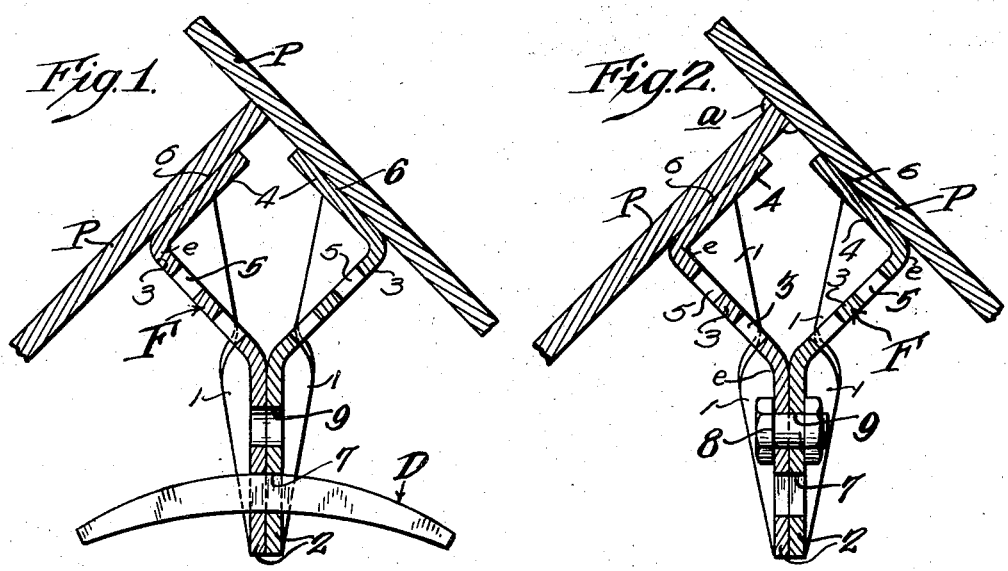
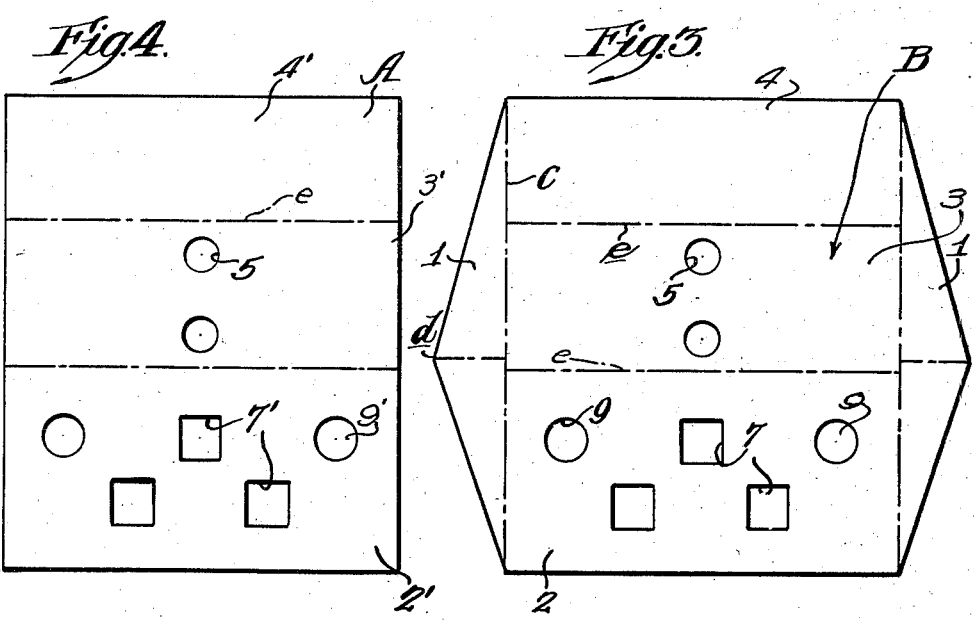
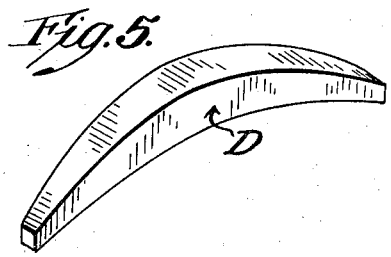
INVENTOR.
Roy W. McLaren
BY Coleman & Lawton
ATTORNEYS Patented July 30, 1946

2,404,857

UNITED STATES PATENT OFFICE 2,404,857

FASTENER FOR POSITIONING, ALIGNING, AND SECURING PLATES FOR WELDING

Roy W. McLaren, Oaklyn, N. J.; Helen H. McLaren, administratrix of said Roy W. McLaren, deceased, assignor to Helen McLaren Application November 24, 1942, Serial No. 466,817

3 Claims. (Cl. 113—99)

This invention relates to standardized types of improved fastener brackets, employed in complemental and companion relationship, for positioning, lining up and securing ship plates and the like for welding.

More particularly, but of equal importance, is the method phase, this having to do with special erection and welding procedures for expeditiously handling, laying out, erecting and welding unwieldly plates, said method having to do with the systematic tack welding of complemental pairs of said automatic plate positioning and aligning fastener brackets at pre-determined spaced intervals along corresponding marginal edges of the cooperable ship plates. The novel procedure embodies secondly the hoisting and swinging of one ship plate toward the companion plate to in this manner land apertured and matchable portions of the neighboring pairs of fasteners one against the other, after which a tapered drift pin is inserted through registerable square apertures in the matchable portions to relatively shift the latter into appropriate alignment and, at the same time, to guide the ship plates accurately into their respective finally assembled positions to accomplish the permanent welding step.

Novelty is also predicated upon the adoption and use of a predetermined type of fastener bracket characterized by a one-piece body including a flat apertured abutment palm and coordinated means for attaching the abutment palm to the ship plate or other work, said means being disposed at a laterally deflected substantially acute angle, approximately 45°, to the body portion.

In the particular form of the bracket depicted in the drawing, it is characterized by two so-called end plates and an intervening intermediate plate, the latter plate being angularly related with respect to the two end plates, one of these end plates being so angled and arranged for tack welding to the ship plate or work, and the remaining end plate being the one which is provided with the apertures (drift pin holes and bolt holes) to accommodate the aforementioned manually inserted hammer driven drift pin.

Other features and advantages will become more readily apparent from the following description and the accompanying illustrative drawing.

In the drawing, wherein like numerals are employed to designate like parts throughout the views:

Figure 1 is a view essentially in section showing a pair of right angularly related ship plates, these having been brought together after the preceding landing step, said plates being provided with a pair of opposed and matched aligning and assembling brackets, these temporarily and shiftably connected to each other by the drift pin shown.

Figure 2 is a view like Figure 1, the ship plates being now permanently welded together and the brackets being bolted together, the brackets tack welded to the ship plates to be left in position, or knocked off the plates if preferred.

Figure 3 is a plan view of the sheet metal blank from which the marginally flanged triple-part fastener bracket (shown in Figures 1 and 2) is fashioned.

Figure 4 is also a top plan view of a blank like that seen in Figure 3, the marginal reinforcing flanges being eliminated.

Figure 5 is a detailed perspective view of the drift pin shown in use in Figure 1.

As illustrated in the accompanying drawing, P denotes adjacent or contiguous plates comprised in a metallic structure such as a ship or building, and are to be connected by welding, as at $a$, in a well-known way. In making this welding connection it is highly important that the plates P be held in proper relative position, and to accomplish this there is provided the improved fasteners or brackets F of duplicate construction so that the same can be readily and conveniently used as rights or lefts.

In the form of the fastener or bracket F as illustrated in Figures 1 and 2, the same is produced from a blank B, as illustrated in Figure 3, and which blank is rectangular in form with the side margins $c$, as indicated by broken lines in Figure 3, defined by the outstanding reinforcing flanges 1. Each of these flanges 1 is of a general V-form with its apex $d$ outwardly disposed and at a point substantially midway the ends of the blank B and with said flange 1 of a length coincident to the length of the blank B. The blank B is folded along the transversely disposed lines $e$, as illustrated in Figure 3, to provide a bottom flat plate or palm 2, an intermediate flat plate 3 extending laterally from the plate 2 at an angle of 45°, and with a third plate or palm 4 extending inwardly from the outer marginal portion of the plate 3 at right angles thereto with the outer free margin of the plate 4 terminating inwardly of the outer face of the plate 2. In this forming of the blank B to provide and arrange the plates 2, 3 and 4 as hereinbefore referred to, the flange 1 of each of the blanks is so twisted at its apex portion to allow said flange 1 to extend inwardly of the plates 3 and 4, and outwardly or rearwardly with respect to the plate 2. By this forming of the flange 1 the bracket B is effectively reinforced in a manner to assure such bracket being of a rigid structure. However, if desired the flange 1 may be omitted, as is illustrated in Figure 4 of the drawing, and in which embodiment of the invention the blank A is substantially the same as the blank B but is folded or bent to provide the plates 2', 3' and 4'.

The plate 3 of each of the fasteners or brackets F at its central part is provided with the openings 5, said openings being at the longitudinal center of the plate 3 and transversely aligned. These openings 5 are adapted to accommodate a jigging tool (not shown) which is used for setting the fasteners or brackets correctly on the sub-assembly to start with. Practice has shown that these openings may be dispensed with or replaced by other means to accommodate the adjacent end of the jigging tool. Therefore, the openings as seen here are somewhat secondary in importance. The plate 4 is welded, as at 6, to a plate P and when adjacent plates P are initially set or assembled the plates 2 of the fasteners or brackets F of adjacent plates P abut or contact, and which setting of the plates P is materially facilitated by the location openings 5. The fasteners or brackets F are secured to the members or plates of the work when such members or plates are lying separated. In other words, the fasteners or brackets F will be welded to the sub-assembly or other steel structural prior to a pair of fasteners or brackets being brought together.

The plate 2 of each of the fasteners or brackets F is provided in its central portion with the square openings 7 and in the initial placing or setting of the plates P the openings 7 of one fastener or bracket F will register with the openings 7 of the fastener or bracket F of the adjacent plate P. There is then inserted through registering openings 7 an elongated drift pin D which is longitudinally curved from end to end and which is oppositely tapered from its central portion to its outer extremities. This drift pin is adapted to be driven through the registering openings 7 by a suitable hammer or other tool, and during which operation exact alignment of the contiguous structure is obtained. As clearly illustrated in the drawings, the drift pin D is square in cross section and when applied its outbow face is inwardly disposed. This is important as the pin cannot be locked up and can be driven home with hammer blows of very short travel, and more particularly when the connection occurs on an inside corner and on the stiffener side or, in other words, in a location in which it is hard to work. After the structure has been properly aligned and tack welded, the fasteners or brackets F can be removed by chipping off the fillet welds or, if desired, the applied brackets or fasteners can be allowed to remain, in which event a suitable bolt 8 is employed and which bolt can be inserted through the properly positioned bolt openings 9 in the plate 2 or through one or more of the drift pin openings 7. In the form of fastener or bracket illustrated in Figure 4 the bolt holes are dispensed with and the bolts are to be selectively inserted through the drift pin openings 7.

In the use of the fasteners or brackets as herein comprised jigging should be used for accurate positioning on the structure, and for this purpose the location openings 5 are of particular value.

The fasteners or brackets F are preferably made of steel plate die-formed cold, although if greater rigidity is required, they may be made from cast steel, weldable quality. The drift pin D is to be made from fairly good quality tool steel.

It is to be pointed out that the fasteners or brackets F, due to the angle of the plates 4, will cause the plates P to slide into position without interference. This sliding movement of the plates P gives the approximate position of the plates in the structure and the application of the drift pin D gives the assembled plates P accurate alignment. It is also to be pointed out that the plates 2 of the coacting fasteners or brackets F, lying as they do in a plane of about 45° or halfway between the surfaces of the plates P to be connected, facilitate erecting and approximate positioning.

Inasmuch as the invention at bar embodies as a phase thereof a preferred jig and method of using the same, attention is hereby made, by way of cross reference, to my copending application Serial No. 476,317, filed in the United States Patent Office February 18, 1943. Secondly, cross reference is also made to the acute and right angled aligning and assembling brackets constituting the subject matter of my copending application Serial No. 476,449, filed February 19, 1943. The subject matter of these two applications is germane to the methodical aspects of the invention defined in the claims of this application.

While I have hereinbefore stated that the blank B is rectangular, it is believed to be obvious that it may be of any other shape preferred.

From the foregoing description it is thought to be obvious that a fastener constructed in accordance with my invention is particularly well adapted for use by reason of the convenience and facility with which it may be assembled and operated.

I claim:

1. As a new article of manufacture, a heavy duty assembly line fastener bracket for erecting, adjustably aligning and temporarily securing complemental ship plates in relatively correct position for permanent welding purposes comprising a substantially flat faced rectangular plate-like abutment of sufficient strength and area for assembling coaction with huge ship plates, said abutment having holes for accommodation of a bolt or bolts and other holes for accommodation of an insertable and removable drift pin, the latter holes being square to accommodate a drift pin of tapered polygonal form, a second rectangular plate formed integral with said abutment and bent to take a position at approximate 45° angles in respect to the abutment, said second plate constituting a connecting web for connection with the ship plate as well as an apron to accommodate a jig tool for assembling the bracket on the ship plates, said second-named plate being provided at opposite ends with lateral spaced parallel flanges for confinement of the jig tool therebetween and to serve as reinforcing elements, and a third plate formed integral with the second-named plate and disposed at right angles and adapted for tack welding on the predetermined attaching area of the ship plate.

2. A method for expeditiously handling, systematically laying out, erecting and permanently welding unwieldly ship plates at right angles to each other consisting in first tack welding complemental pairs of automatic plate assembling, positioning and aligning fastener brackets at predetermined spaced intervals along corresponding marginal edges of a pair of said ship plates, the exact locations and tack welding spots of the respective brackets on the respective ones of said pair of ship plates being attained by advance planning and predetermined calculations oriented from ship plates being attained by points permanently established in an independent jig setting platen, secondly, hoisting and swinging one multiple bracket equipped ship plate toward the companion as well as correspondingly bracketed ship plate and landing matchable apertured portions of the coacting pairs of fastener brackets one against the other, and, third, inserting and driving a tapered drift pin through registrable apertures in said matchable portions to relatively shift the brackets as well as the plates into alignment and thus guide said ship plates into their respective finally assembled positions for expedient handling of the permanent ship plate welding step, the apertured landing and matchable portions of the brackets being in the form of abutment palms, each palm being disposed at an approximate 45° angle in relation to the plate on which it is mounted.

3. As a new article of manufacture, a heavy duty assembly line fastener bracket for erecting, adjustably aligning and temporarily securing complemental ship plates in relatively correct positions for permanent welding purposes comprising a substantially flat rectangular plate-like abutment of sufficient strength and area for assembling coaction with huge right-angularly disposable ship plates, said abutment having holes for accommodation of a bolt or bolts and other holes for accommodation of a bodily insertable and removable drift pin, the latter holes being squared to accommodate a drift pin of tapered polygonal form, a second rectangular plate formed integral with one edge portion of said abutment, said second plate being bent to take a position at an approximate 45° angle in respect to said abutment, said second plate constituting a connecting web for attachment to a complemental ship plate and also constituting an apron, the latter to accommodate a jig tool for assembling the bracket on the ship plate, and said bracket being provided at opposite marginal ends with a pair of laterally projecting flanges, said flanges serving as stiffening elements and also defining a pocket-like receptacle for receiving and confining said jig tool therein and between said flanges.

ROY W. McLAREN.